United States Patent [19]

Uchiyama et al.

[11] 4,158,074
[45] Jun. 12, 1979

[54] PROCESS FOR PREPARING COLORED ALUMINUM POWDER

[75] Inventors: Toshimitsu Uchiyama; Minoru Hasegawa; Tatsuo Ootsuka; Hiroshi Matsumoto, all of Sakai, Japan

[73] Assignee: Showa Aluminum Kabushiki Kaisha, Sakai, Japan

[21] Appl. No.: 879,538

[22] Filed: Feb. 21, 1978

Related U.S. Application Data

[63] Continuation-in-part of Ser. No. 694,745, Jun. 10, 1976, abandoned.

[30] Foreign Application Priority Data

Jun. 19, 1975 [JP] Japan .................................. 50-75117

[51] Int. Cl.$^2$ ................................................. C09C 1/00
[52] U.S. Cl. .................................... 427/214; 427/216; 106/308 B; 106/290; 106/288 B
[58] Field of Search ............... 148/6.27; 427/216, 217, 427/218, 214; 106/288 B, 308 B, 290; 204/35 N

[56] References Cited

U.S. PATENT DOCUMENTS

| | | | |
|---|---|---|---|
| 2,008,733 | 7/1935 | Tosterud | 204/35 N |
| 3,007,052 | 12/1962 | Frieser | 106/308 B |
| 3,152,970 | 10/1964 | Jensen | 204/35 N |
| 3,545,994 | 12/1970 | Lott | 106/304 |
| 3,825,438 | 7/1974 | Pritchard et al. | 106/308 B |
| 4,045,599 | 8/1977 | Ramaley | 204/35 N |

*Primary Examiner*—Sam Silverberg
*Attorney, Agent, or Firm*—Allison C. Collard; Thomas M. Galgano

[57] ABSTRACT

Colored aluminum powder is prepared by immersing finely divided aluminum in a weak alkali solution maintained at a temperature of 50° C. to the boiling point of the solution and having a pH of 8 to 12, said solution containing a salt of iron, nickel, cobalt, zinc or copper, and at least one aliphatic amine having a chelating ability for the metal salt, to form a composite film which consists of a hydrated aluminum oxide and a hydrated oxide of the metal, and separating the aluminum from the solution.

6 Claims, No Drawings

PROCESS FOR PREPARING COLORED ALUMINUM POWDER

This application is a continuation-in-part of application Ser. No. 694,745 filed June 10, 1976, now abandoned.

BACKGROUND OF THE INVENTION

This invention relates to a process for preparing colored aluminum powders, and more particularly to a process for preparing a colored aluminum powder to be added to a coating composition as a pigment to give the composition a metallic color.

The term "aluminum" as used herein and in the claims includes pure aluminum, commercial aluminum containing small amounts of impurities and aluminum alloys in which aluminum predominates.

It is known to add finely divided metal to a coating composition as a pigment to prepare a coating composition having a metallic color. As such metal powder pigment, aluminum powder is used to obtain a silver color, or brass powder is used to give a gold color. Use of brass powder involves problems in that it is expensive, unusable for articles related to beverages and foods because it is harmful, prone to discoloration and corrosion depending on the environment, liable to delustering and subject to color change to gray at a temperature of 300° to 500° C.

Attempts have also been made to add colored aluminum powders to coating compositions to prepare compositions having varying metallic colors. For this purpose, various studies have been made on methods for coloring aluminum particles which mainly include two methods: one in which an oxide film formed on the surface of aluminum particles is colored with an organic dye, and the other in which a colored synthetic resin film is coated with aluminum by vacuum evaporation and the coated film is then comminuted. However, these methods are infeasible because the aluminum particles colored by the former method have not ful resistance to weather and corrosion nor sufficient brilliance, while the latter method requires a very expensive apparatus for vacuum evaporation coating and further produces colored aluminum particles of poor resistance to heat and weather.

SUMMARY OF THE INVENTION

This invention has overcome the foregoing problems and provides a process for preparing a colored aluminum powder comprising the steps of immersing finely divided aluminum in a weak alkali solution maintained at a temperature of 50° C. to the boiling point of the solution and having a pH of 8 to 12, said solution containing a salt of iron, nickel, cobalt, zinc or copper, and at least one aliphatic amine having a chelating ability for the metal salt, to form a composite film which consists of a hydrated aluminum oxide and a hydrated oxide of the metal, and separating the aluminum from the solution. The present process gives gold and various other colors. The gold-colored aluminum powder prepared by the present process is superior to brass powder in that it can be prepared from a less expensive material, has one third the specific gravity of brass powder and is therefore serviceable in amounts correspondingly smaller in weight, is usable for any article because aluminum is not harmful and has higher resistance to weather, heat and corrosion. As compared with the foregoing two methods of variously coloring aluminum, the present process is superior to one of them in giving products of higher resistance to weather and corrosion and of better brilliance, and is economically advantageous over the other in that it not only produces colored aluminum particles of excellent resistance to heat and weather but also does not require an expensive apparatus.

DETAILED DESCRIPTION OF THE INVENTION

The composite film is of such a structure that minute particles of a hydrated metal oxide, colored component, are uniformly adhered among the crystals of a hydrated aluminum oxide film by an electro-chemical reaction on the base of a hydrated aluminum oxide. A hydrated aluminum oxide affords corrosion-resistance to aluminum particles and assists a hydrated metal oxide in adhering. Meanwhile, a hydrated metal oxide gives aluminum particles the colors of high resistance to weather and heat. In the case where a colored aluminum powder is mixed with a painting material for use as a pigment, brilliance is required for the aluminum powder to be a material of the pigment. However, the formation of the hydrated aluminum oxide film should not cause the brilliance to disappear. Therefore, the hydrated aluminum oxide film formed on the surface of aluminum particles must be uniform and thin. To obtain such a film, the solution for treating aluminum particles is limited to weak alkali solutions having a pH of 8 to 12. The reasons are as follows.

With a strong acid solution, or a strong alkali solution, hydrated aluminum oxide films do not form on aluminum particles. Rather, an explosive etching reaction proceeds whereby not only the aluminum particles are apt to dissolve and disappear, but also the treatment will be accompanied with dangers. Although a hydrated aluminum oxide film proceeds to form in a weak acid solution, the formation of a uniform film is hopeless. On the other hand, in a weak alkali solution having a pH of 8 to 12, a hydrated aluminum oxide film proceeds to form without the occurrence of such explosive etching reaction, thereby a uniform and thin film being produced.

Generally, a hydrated metal oxide readily deposits in a weak alkali solution, so that it is necessitated to chelate metal ions for keeping a metal salt stable in a coloring solution, the metal salt becoming a colored component. The following two requirements must be satisfied so as to select a suitable chelating agent for each metal salt. One is that a chelating agent to be used should have a proper chelating ability for each metal ion. Since a too strong chelating ability stabilizes a produced chelate exceedingly, metal ions are prevented from participating in the precipitation reaction on aluminum particles, which results in the difficulty of coloration. On the other hand, a too weak chelating ability makes a produced chelate unstable, so that a hydrated metal oxide deposits in the solution. This makes it impossible to execute the coloring process. For example, the combination of iron with EDTA falls in the former case while that of iron with ethylene glycol does in the latter case. The other requirement is that the hydrated aluminum oxide appearing on the surface of aluminum particles should not be adversely effected by a chelating agent during the coloring process but should keep the smoothness and brilliance of the aluminum particles.

There exist many metal salts enabling the coloring process by applying the principle of the present invention. However, among these metal salts only the salts of iron, nickel, cobalt, zinc, and copper could afford a full efficiency in view of the weather- and heat-resistance and of the uniformity of coloring tone which pertain to the hydrated metal oxide precipitated on the surface of the aluminum particles. Various kinds of amines are cited as examples of the chelating agents which fulfil the foregoing requirements for use with those metal salts and can perform the coloration. Among them the following aliphatic amines are preferable. These are methylamine, dimethylamine, ethylamine, ethylenediamine, monoethanolamine, diethanolamine, triethanolamine. Triethanolamine is especially preferable when the stability of chelate and the protectiveness of hydrated aluminum oxide are considered. These amines may be employed singly or in an admixture of at least two kinds. Further, it is preferable to admix the foregoing amines having a chelating ability with aliphatic carboxylic acids such as oxalic acid, malonic acid, malenic acid, succinic acid, tartaric acid, malic acid, citric acid, lactic acid, etc. or their salts. As we mentioned above, the treating solution should be a weak alkali solution having a pH of 8 to 12 so as to obtain a uniform and thin hydrated aluminum oxide film on the surface of aluminum particles. When the pH value is below 8, the stability of a chelate is deteriorated in the solution to thereby promote the precipitation of a hydrated metal oxide, which makes it difficult to color aluminum particles. Even within the range of 8 to 12, the higher the pH value, more actively aluminum tends to react and as a result its brilliance gets lowered. Consequently, the pH value most preferably is within the range of 9 to 11 for ensuring a steady coloration while the brilliance is maintained.

The aliphatic amines having a chelating ability prevent the metal salt from precipitating from the weak alkali solution in the form of a hydrated metal oxide, chelating the salt to maintain the metal component in the form of ions. The kind of the aliphatic amines to be used as the chelating agent differs with the kind of the metal salt to be used in combination therewith. For example, when finely divided aluminum is colored with an iron salt, it is preferable to use triethanolamine singly or in admixture with oxalic acid for the purpose of enhancing the stability of the chelate in a treating solution. The amount of the aliphatic amines to be used also varies with the kind and concentration of the metal salt, the degree to which the aluminum particles are to be colored and the amount of the film to be formed on the surface of the aluminum particles. When iron salts are used for coloration, a preferable example of the solution contains 0.001 to 0.5 mol/liter of ferric nitrate, 0.01 to 2.0 mol/liter or triethanolamine and 0.001 to 2.0 mol/liter of oxalic acid. If the amount of triethanolamine exceeds the above-metnioned upper limit, the iron chelate becomes too stabilized, inhibiting the precipitation of hydrated iron oxide particles on the surface of the aluminum particles. Conversely if the amount is less than the lower limit, molecules of water will be coordinated to some of the iron ions, impairing the stability of the chelate.

When the solution containing only the metal salt and the aliphatic amine having a chelating ability has not a pH value of 8 to 12, an alkali such as alkali hydroxide, alkali carbonate or alkali aluminate can be added to the solution to adjust the pH to the above-mentioned range.

The treatment is possible at a temperature within the range of 50° C. to the boiling point of the treating solution. If the temperature is lower than 50° C., the precipitated hydrated metal oxide coheres and adheres insufficiently to easily fall down. Further, as the temperature comes near to the boiling point, more actively will occur the dissolution reaction of aluminum which accompanies the formation reaction of hydrated aluminum oxide proceeding simultaneously with the coloration. When extremely minute aluminum particles are used, most of them are converted into hydrated oxides, thereby losing the brilliance. Consequently, especially in the case of the finely divided aluminum material to be employed as a pigment, or the like, the treating temperature is preferably about 60° C. to about 85° C. Although the duration of immersion treatment for aluminum particles mainly varies with the degree to which the aluminum particles are to be colored, it may be properly selected within the range of 30 to 90 minutes.

When coloring the aluminum material with an iron salt, it is most preferable to use a weak alkali solution containing 0.01 to 0.1 mol/liter of ferric nitrate, 0.1 to 1.0 mol/liter of triethanolamine and 0.01 to 0.1 mol/liter of oxalic acid and having a pH of about 9.8 to about 10.8. This solution ensures the uniformity of the color of the hydrated iron oxide adhered on the surface of the aluminum particles.

When the finely divided aluminum material is immersed in the above solution as maintained at about 50° C. to the boiling point of the solution, the surface of the aluminum particles is formed with a film which consists of a hydrated aluminum oxide and a hydrated iron oxide in a composite state, presumably by virtue of the following mechanism. The above-mentioned treatment first forms a hydrated aluminum oxide film on the surface of the aluminum particles. The electrons produced at this time are accepted by the trivalent iron ions contained in the solution, whereby the iron ions are reduced to bivalent iron ions, which in turn react with the alkali to form $Fe(OH)_2$. Since the ferrous hydroxide is active, it is converted to $Fe(OH)_3$, which is so cohesive that it combines uniformly with the hydrated aluminum oxide film and further partly dehydrates, consequently hydrated iron oxide uniformly depositing on the surface of the hydrated aluminum oxide. Thus, a colored film is formed on the surface of the aluminum particles. Because the colored film on the surface of the aluminum particles is based on the hydrated aluminum oxide film, it has very high corrosion resistance.

According to this invention, the color given by the composite film consisting of the hydrated oxide on the surface of the aluminum particles and a hydrated metal oxide has higher resistance to weather and corrosion than the color conventionally obtained by dying an oxide film formed on the surface of aluminum particles with an organic dye. Since the color is given by the hydrated metal oxide according to this invention, it has increased thermal stability, i.e. improved heat resistance.

More preferably, the finely divided aluminum material may be immersed in a neutral or weak alkali solution of pH 7 to 12 maintained at a temperature of 50° C. to the boiling point of the solution to form a hydrated oxide film thereon before being subjected to the coloring process. This treatment is effective in improving the uniformity of the film and in preventing the deterioration of brilliance because a hydrated metal oxide deposits and coheres within the minute pores of the hydrated oxide film on the surface of aluminum particles during the coloring process to thereby minimize the diameter of the precipitated particles. Further, it is effective in hindering the precipitated hydrated metal oxide from separating off. Pure water, alkali hydroxides, alkali carbonates, alkali aluminates, triethanolamine, and so on are usable as the aqueous solution having a pH of 7 to 12. Pure water or triethanolamine is preferable when the maintained brilliance of aluminum particles and the uniformity of the film are taken into consideration. More specifically, if aluminum particles are treated in an aqueous solution containing 0.01 to 0.1 mol/liter of triethanolamine at a temperature of 50° to 80° C. for 10 to 20 minutes, a uniform hydrated oxide film can be formed while the brilliance is maintained.

The colored aluminum particles are separated from the treating solution generally by filtration. The particles are of course separable by centrifugation.

When the treating solution has become degraded, the solution can be regenerated by acidifying the solution with an acid and adding the specified metal salt and alkali to the solution.

By suitably selecting the combination of the metal salt and the aliphatic amine or amines having a chelating ability, varying colors such as gold, blackish brown, grayish white, etc. can be given to the film on the surface of the aluminum particles. Further by altering the composition of the weak alkali solution and the temperature and the duration for the coloring process, the lightness, density and saturation of the color are also controllable.

A magnetic aluminum powder can be prepared by using a salt of iron, nickel or cobalt as the metal salt under selected treating conditions. The magnetic colored aluminum powder will afford new applications to aluminum.

EXAMPLE 1

Ten gram portions of finely divided aluminum were immersed in various treating solutions under varying conditions, and the treated aluminum particles were separated from the solution by filtration. The compositions of the solution, treating conditions and the colors obtained are listed below.

| Metal salt | Organic compound having chelating ability | pH | Treating temp. | Immersion time | Color |
|---|---|---|---|---|---|
| Copper acetate 0.0015 mol/l | Ethylenediamine 0.02 mol/l | 10.0 | 80° C. | 15 min. | Uniform blackish brown |
| Zinc acetate 0.0015 mol/l | " | 10.2 | " | " | Uniform grayish white |
| Cobalt acetate 0.0015 mol/l | Oxalic acid 0.0008 mol/l, triethanolamine 0.02 mol/l | 10.1 | " | " | Uniform blackish gold |
| Nickel acetate 0.0015 mol/l | " | " | " | " | " |
| Ferric nitrate 0.0015 mol/l | Oxalic acid 0.0015 mol/l triethanolamine 0.02 mol/l | " | 50° C. | 30 min. | Uniform blackish gold |
| " | " | " | 80° C. | " | Slightly blackish uniform gold |
| " | " | " | 100° C. | " | Uniform gold |
| " | Ethylenediamine 0.02 mol/l | 10.3 | 80° C. | 15 min. | Uniform gold |
| Ferric nitrate 0.0015 mol/l | Dimethylamine 0.02 mol/l | 10.0 | 80° C. | 15 min. | Pale gold |
| " | Monoethanolamine 0.02 mol/l | 9.8 | " | " | " |
| " | Diethanolamine 0.02 mol/l | 10.3 | " | " | " |
| " | Triethanolamine 0.02 mol/l | 10.1 | " | " | Uniform gold |

EXAMPLE 2

For pretreatment and hydration, 10 g of finely divided aluminum was immersed for 15 minutes in an aqueous solution containing 0.07 mol/liter of triethanolamine and having a pH of 10.3 and a temperature of 60° C. and was thereafter separated from the solution by filtration.

The aluminum particles having a hydrated aluminum film produced on their surface by this treatment were immersed for 15 minutes in 1 liter of solution containing 0.08 mol/liter of ferric nitrate, 0.08 mol/liter of sodium oxalate and 0.6 mol/liter of triethanolamine and having a pH of 10.3 and a temperature of 65° C. and were thereafter separated from the solution by filtration. The colored aluminum particles obtained had a uniform gold color.

EXAMPLE 3

To the coloring solution used in Example 2 and recovered by filtration were added 0.02 mol/liter of ferric nitrate and 0.06 mol/liter of sodium hydroxide to prepare a regenerated treating solution having a pH of 10.5 A 10 g quantity of aluminum particles having a hydrated aluminum oxide film formed on the surface thereof in the same manner as in Example 2 were immersed in the regenerated solution at 65° C. for 15 minutes and thereafter separated from the solution by filtration. The resulting aluminum particles were found to have been uniformly colored gold.

This invention may be otherwise embodied without departing from the spirit and basic features of the invention. Accordingly it is to be understood that the examples herein disclosed are given solely for illustrative purposes and are not limitative, and that the scope of this invention is defined by the appended claims rather than by the specification. Thus other changes and modifications may be made within the scope of the claims.

What we claim is:

1. A process for preparing a colored aluminum powder consisting essentially of the steps of immersing finely divided aluminum in a weak alkali solution maintained at a temperature of between 50° C. and the boiling point of the solution and having a pH of 8 to 12, said solution containing a salt of a metal selected from the group consisting of iron, nickel, cobalt, zinc and copper, and at least one amine selected from the group consisting of methylamine, dimethylamine, ethylamine, ethylenediamine, monoethanolamine, diethanolamine and triethanolamine, to form a composite film which consists of a hydrated aluminum oxide and a hydrated oxide of the metal, and separating the resulting aluminum particles from the solution to obtain colored aluminum particles.

2. The process as defined in claim 1 wherein the weak alkali solution further contains an alkali selected from the group consisting of alkali hydroxides, alkali carbonates and alkali aluminates.

3. The process as defined in claim 1 wherein the weak alkali solution further contains at least one member selected from the group consisting of water soluble aliphatic carboxylic acids and their salts.

4. A process for preparing a colored aluminum powder consisting essentially of the steps of immersing finely divided aluminum in a weak alkali solution maintained at a temperature of between 50° C. and the boiling point of the solution and having a pH of 8 to 12, said solution containing 0.001 to 0.5 mol/liter of an iron salt, 0.01 to 2.0 mol/liter of triethanolamine and 0.001 to 2.0 mol/liter of oxalic acid, to form a composite film which consists of a hydrated aluminum oxide and a hydrated iron oxide, and separating the resulting aluminum particles from the solution to obtain aluminum particles colored in gold.

5. A process for preparing a colored aluminum powder consisting essentially of the steps of forming a hydrated aluminum oxide film on the surface of aluminum particles by immersing the aluminum particles in a solution maintained at a temperature of 50° C. to the boiling point of the solution and having a pH of 7 to 12, immersing the aluminum particles with the thus formed hydrated oxide film in a weak alkali solution maintained at a temperature of between 50° C. and the boiling point of the solution and having a pH of 8 to 12, said solution containing a salt of a metal selected from the group consisting of iron, nickel, cobalt, zinc and copper, and at least one amine selected from the group consisting of methylamine, dimethylamine, ethylamine, ethylenediamine, monoethanolamine, diethanolamine, and triethanolamine, to form a composite film which consists of a hydrated aluminum oxide and a hydrated oxide of the metal, and separating the resulting aluminum particles from the solution to obtain colored aluminum particles.

6. A process for preparing a colored aluminum powder consisting essentially of the steps of forming a hydrated aluminum oxide film on the surface of aluminum particles by immersing the aluminum particles in a solution maintained at a temperature of between 50° C. to the boiling point of the solution and having a pH of 7 to 12, immersing the aluminum particles with the thus formed hydrated oxide film in a weak alkali solution maintained at a temperature of between 50° C. and the boiling point of the solution and having a pH of 8 to 12, said solution containing 0.001 to 0.5 mol/liter of an iron salt, 0.01 to 2.0 mol/liter of triethanolamine, and 0.001 to 2.0 mol/liter of oxalic acid, to form a composite film which consists of a hydrated aluminum oxide and a hydrated iron oxide, and separating the the resulting aluminum particles from the solution to obtain aluminum particles colored in gold.

* * * * *